(12) United States Patent  (10) Patent No.: US 8,448,088 B2
Kikuchi et al.  (45) Date of Patent: May 21, 2013

(54) IMAGE DISPLAY SYSTEM, IMAGE SUPPLY DEVICE, IMAGE DISPLAY DEVICE, IMAGE DISPLAY METHOD, AND COMPUTER PROGRAM PRODUCT

(75) Inventors: Yosuke Kikuchi, Fuchu (JP); Yuichi Kitazawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 808 days.

(21) Appl. No.: 12/500,175

(22) Filed: Jul. 9, 2009

(65) Prior Publication Data

US 2010/0017745 A1    Jan. 21, 2010

(30) Foreign Application Priority Data

Jul. 16, 2008    (JP) ................................. 2008-184745

(51) Int. Cl.
 *G06F 3/048*    (2006.01)
 *G06F 3/00*     (2006.01)

(52) U.S. Cl.
 USPC ........... 715/802; 715/781; 715/783; 715/788; 715/790; 715/794; 715/799; 715/803

(58) Field of Classification Search
 USPC ................. 715/734–745, 781, 764, 783, 788, 715/790, 794, 798, 799, 802, 803
 See application file for complete search history.

(56) References Cited

U.S. PATENT DOCUMENTS

| | | | |
|---|---|---|---|
| 7,131,068 B2 * | 10/2006 | O'Neal et al. | 715/730 |
| 7,401,297 B2 * | 7/2008 | Hori et al. | 715/781 |
| 7,454,708 B2 * | 11/2008 | O'Neal et al. | 715/730 |
| 7,551,175 B2 | 6/2009 | Sakanishi et al. | |
| 2003/0142135 A1 * | 7/2003 | Hori et al. | 345/781 |
| 2005/0091610 A1 * | 4/2005 | Frei et al. | 715/804 |
| 2006/0176293 A1 | 8/2006 | Hoshino | |
| 2007/0026800 A1 * | 2/2007 | Hsu | 455/41.2 |
| 2007/0174784 A1 * | 7/2007 | Yu et al. | 715/799 |
| 2007/0188482 A1 | 8/2007 | Fujimori | |
| 2007/0257927 A1 * | 11/2007 | Sakanishi et al. | 345/581 |

FOREIGN PATENT DOCUMENTS

| | | |
|---|---|---|
| CN | 101021675 A | 8/2007 |
| JP | 2000-339130 A | 12/2000 |
| JP | 2005-149440 A | 6/2005 |
| JP | 2008-040190 A | 2/2008 |
| WO | WO-2005-088602 A | 9/2005 |

* cited by examiner

*Primary Examiner* — Nicholas Augustine
(74) *Attorney, Agent, or Firm* — ALG Intellectual Property, LLC

(57) ABSTRACT

In at least one embodiment of the disclosure, an image display system includes an image display device configured to display a display image based on supply content, and a plurality of image supply devices. Each of the image supply devices includes a display section having a first display area configured to display the display image of the image display device. The image supply devices each include a content selection section configured to receive a selection of supply content from among a plurality of supply contents stored with the image supply device. The image display device is configured to receive the supply content from at least two of the image supply devices and display the supply content as the display image.

12 Claims, 16 Drawing Sheets

PROJECTOR OPERATION SCREEN

PROJECTOR PROJECTION IMAGE

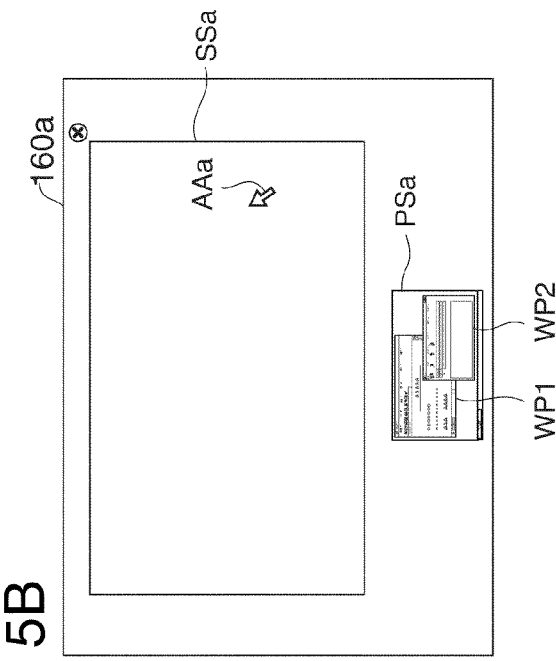
FIG. 5A
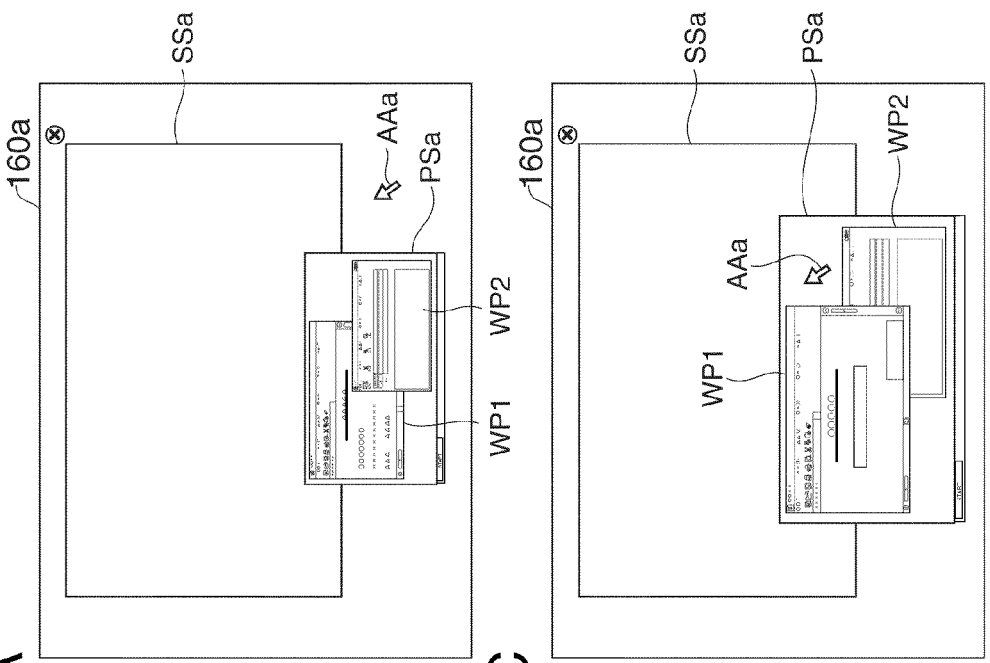
FIG. 5B
FIG. 5C

IMAGE DISPLAY SYSTEM, IMAGE SUPPLY DEVICE, IMAGE DISPLAY DEVICE, IMAGE DISPLAY METHOD, AND COMPUTER PROGRAM PRODUCT

CROSS-REFERENCE

The present application claims priority from Japanese Patent Application No. 2008-184745 filed on Jul. 16, 2008, which is hereby incorporated by reference in its entirety.

BACKGROUND

When giving a presentation, there are some cases in which only an image field of a specific window rather than the entire screen displayed on a display device needs to be displayed on an external monitor. There is known a technology of outputting to an external monitor only an image of the window selected with a mouse pointer among a plurality of windows displayed on a display device (see, e.g., Japanese Patent Publication No. 2000-339130).

However, consideration is not made of connecting together a plurality of image supply devices with an image display device and improving the operability in such case.

SUMMARY

Various embodiments of the disclosure have been developed in response to the current state of the art, and in response to problems, needs, and demands that have not been fully or completely solved by currently available systems, devices and methods. For example, various embodiments may solve at least a part of the problem described above, thereby improving convenience of operations in an image display system.

At least one embodiment is directed to an image display system including N (N is an integer equal to or greater than 2) image supply devices, and an image display device adapted to display a supplied image supplied from the image supply devices, and each of the N image supply devices includes a second display section adapted to display an image including a first display area displaying a display content of the image display device, and a content selection section adapted to select a display content to be displayed on the image display device along an operation of a user among a plurality of contents held by the image supply device itself, and the image display device displays a display image including the display content selected in M (M is an integer equal to or greater than 2 and equal to or smaller than N) image supply devices among the N image supply devices.

According to this embodiment, since the image supply device displays the display content of the image display device, and the image display device displays the display contents of the plurality of image supply devices on the first display section, convenience of the image display system may be improved.

At least one embodiment is directed to the image display system according to the previously described embodiment, wherein the display section displays an image including, in addition to the first display area, a second display area displaying a plurality of contents held by the image supply device itself, and the content selection section selects the display content along an operation of the user including the operation to the second display area.

According to this embodiment, since the display content can more easily be selected by an operation including the operation to the second display area, convenience of the image display system may be further improved.

At least one embodiment is directed to the image display system according to at least one of the previously described embodiments, wherein in a case in which the display contents are selected, the second display area and a display area of the image display device are divided into a plurality of divisional areas, and the display contents are displayed in the respective divisional areas.

According to this embodiment, a plurality of display contents may more easily be displayed.

At least one embodiment is directed to the image display system according to at least one of the previously described embodiments, wherein the operation of the user includes an operation of selecting the display content in the second display area, and an operation of designating a location in the first display area, and the first display section displays the selected display content at a location in the first display area corresponding to the designated location in the first display area.

According to this embodiment, the user may select the display content with an easier operation.

At least one embodiment is directed to the image display system according to at least one of the previously described embodiments, wherein the display content displayed on the first display section can be edited in the image supply device selecting the display content.

According to this embodiment, since the display content displayed can be edited in the image supply device, convenience of the user may further be improved.

At least one embodiment is directed to the image display system according to at least one of the previously described embodiments, wherein each of the N image supply devices further includes a content selection cancellation section adapted to cancel selection of the selected display content along an operation of the user including an operation to the first display area, and the image display device deletes display of the display content, selection of which is canceled, to the first display section in response to the cancellation of the selection.

According to this embodiment, since the cancellation of the display of the content can be executed, convenience of the user may further be improved.

It should be noted that the embodiments can be realized in various forms such as an image display method, a computer program product, or a storage medium storing the computer program besides the image display device, or the image supply device.

BRIEF DESCRIPTION OF THE DRAWINGS

Non-limiting and non-exhaustive embodiments of the present disclosure will now be described with reference to the accompanying drawings, wherein like reference numbers reference like elements.

FIG. 1 is an explanatory diagram showing a schematic configuration of an image display system according to at least one embodiment.

FIG. 2 is a block diagram schematically showing an internal configuration of an image supply device according to an embodiment.

FIG. 3 is a block diagram schematically showing an internal configuration of an image display device according to an embodiment.

FIGS. 4A and 4B are diagrams schematically showing images displayed when the image display system operates.

FIGS. 5A through 5C are a first group of diagrams for illustrating an operation of the image display system.

DESCRIPTION OF EMBODIMENTS

Figure 1:
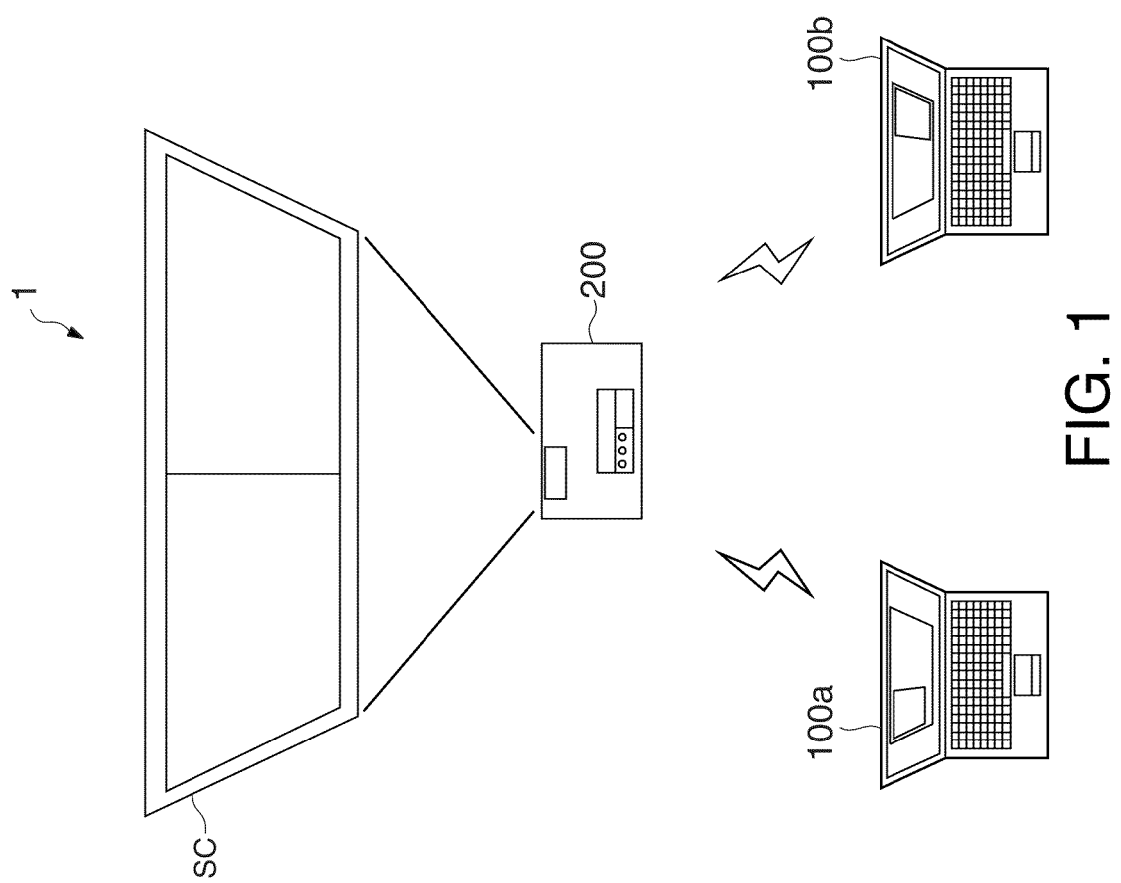

In the following description, reference is made to the accompanying drawings which form a part hereof, and in which are shown, by way of illustration, specific embodiments in which the disclosure may be practiced. It is to be understood that other embodiments may be utilized and structural or logical changes may be made without departing from the scope of the present disclosure. Therefore, the following description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

The method or procedure is described in terms of firmware, software, and/or hardware with reference to the flowchart. Describing a method by reference to a flowchart enables one skilled in the art to develop programs, including instructions to carry out the processes and methods on suitably configured computer systems and processing devices. In various embodiments, portions of the operations to be performed by the image display method may constitute circuits, general purpose processors (e.g., micro-processors, micro-controllers, an ASIC, or digital signal processors), special purpose processors (e.g., application specific integrated circuits or ASICs), firmware (e.g., firmware that is used by a processor such as a micro-processor, a micro-controller, and/or a digital signal processor), state machines, hardware arrays, reconfigurable hardware, and/or software made up of executable instructions. The executable instructions may be embodied in firmware logic, reconfigurable logic, a hardware description language, a state machine, an application-specific integrated circuit (ASIC), or combinations thereof.

With respect to various embodiments using a software implementation (e.g., a hardware simulator), at least one of the processors of a suitably configured processing device executes the instructions from a storage and/or recording medium. The computer-executable instructions may be written in a computer programming language or executable code. If written in a programming language conforming to a recognized standard, such instructions may be executed on a variety of hardware platforms and may interface with a variety of operating systems. Although the various embodiments are not described with reference to any particular programming language, it may be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software causes the processor to perform an action or to produce a result.

A. First Embodiment

Configuration of Image Display System

FIG. 1 is an explanatory diagram showing a schematic configuration of an image display system according to the first embodiment. The image display system 1 is equipped with two image supply devices 100a, 100b, and an image display device 200. The two image supply devices 100a, 100b are each connected to the image display device 200 via a wireless local area network (LAN). The image supply devices 100a, 100b and the image display device 200 can also be connected using other connection methods, and can be connected via, for example, Universal Serial Bus (USB) cables.

Configuration of Image Supply Device

Figure 2:
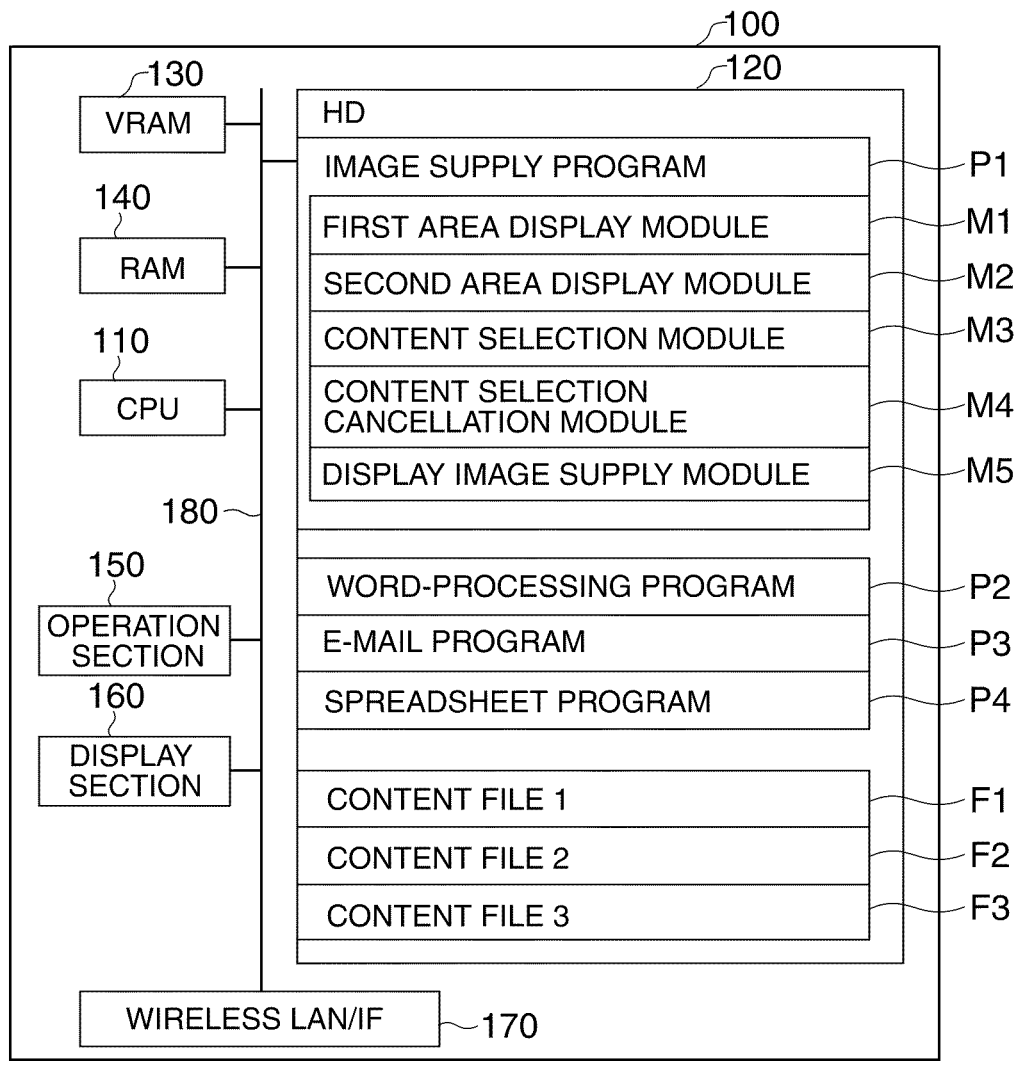

FIG. 2 is a block diagram schematically showing an internal configuration of the image supply device according to the first embodiment. The internal configurations of the two image supply devices 100a, 100b are the same, and therefore, explained as a configuration of the image supply device denoted with the reference numeral 100 with trailing symbols eliminated therefrom. The image supply device 100 may be, for example, a laptop personal computer. The image supply device 100 is provided with a central processing unit (CPU) 110, a hard disk drive (HD) 120, a drawing memory (VRAM)

130, a random access memory (RAM) 140, an operation section 150 such as a keyboard or a touch pad, a display section 160 such as a liquid crystal display, and a wireless LAN interface (IF) 170. These constituents 110 through 170 are connected to each other via a common bus 180 so as to allow two-way communication. It should be noted that a nonvolatile semiconductor memory can also be provided instead of the HD 120.

The CPU 110, which is a logic circuit for executing various kinds of arithmetic processing, expands various programs and modules stored in, for example, the HD 120 in the RAM 140, and then executes them. The RAM 140 is a volatile memory, and stores temporarily the operation results of the CPU 110, and data of the display image to be supplied to the image display device 200. The VRAM 130 is a memory for expanding and then temporarily buffering the data of the display image drawn based on the data, and is generally capable of reading and writing the data faster than the RAM 140. The wireless LAN/IF 170 communicates a signal in a wireless manner between the image supply device 100 and external equipment such as the image display device 200 shown in FIG. 3. Instead of the wireless interface, a wired interface, such as an USB interface can also be provided.

The HD 120 stores an image supply program P1, content processing programs P2 through P4, and content files F1 through F3. Although in the present embodiment there are stored a word-processing program P2, an e-mail program P3, and a spreadsheet program P4 as the content processing programs, any types or number of content processing programs can be adopted. The content files F1 through F3 are created, displayed, or created and displayed using the content processing programs P2 through P4. The content files correspond to, for example, document files created and displayed using the word-processing program P2, e-mail files created and displayed using the e-mail program P3, spreadsheet files created and displayed using the spreadsheet program P4, and so on. Further, instead of these files, still image files and moving image files displayed using a viewer program, presentation files created, displayed, or created and displayed using a presentation program can also be used.

The image supply program P1 includes a first area display module M1, a second area display module M2, a content selection module M3, a content selection cancellation module M4, and a display image supply module M5. It should be noted that the functions of the modules are realized by the CPU 110 executing the respective modules.

The first area display module M1 displays the display content of a projector projection image described later on a first area of a projector operation screen described later. The second area display module M2 displays a plurality of contents held by the image supply device 100 itself in a second area of the projector operation screen described later. The content selection module M3 selects a display content to be displayed as the projector projection image among the plurality of contents held by the image supply device 100 itself displayed in the second area. The selection of the display content is performed along an operation of the user. The content selection cancellation module M4 cancels the selection of the display content (the display content displayed as the projector projection image) thus selected along an operation of the user. The display content thus canceled is then deleted from the projector projection image. The display image supply module M5 supplies (transmits) the image of the display content thus selected to the image display device 200.

The image supply program P1 is a program for supplying the image display device 200 with the data of the image to be displayed on the image display device 200. More specifically, the image supply program P1 in the present embodiment is capable of supplying the image display device 200 with a plurality of contents displayed on the display section 160 of the image supply device 100 content by content. Here, the content denotes a display screen provided by each of the content processing programs (application programs), and includes a document processing screen in the word-processing program P2, an e-mail processing screen in the e-mail program P3, a spreadsheet file creation screen in the spreadsheet program P4, a presentation screen in the presentation program, a reproduction screen for reproducing a moving image content, and an editing screen and a display screen of a still image. Further, a so-called desktop screen displayed as a background of the display section 160 of the image supply device 100 is also included in the content. It should be noted that each of these contents is called a window in the case of using Windows (a registered trademark) as an operating system, and therefore, is hereinafter referred also to as a "window."

Configuration of Image Display Device

Figure 3:
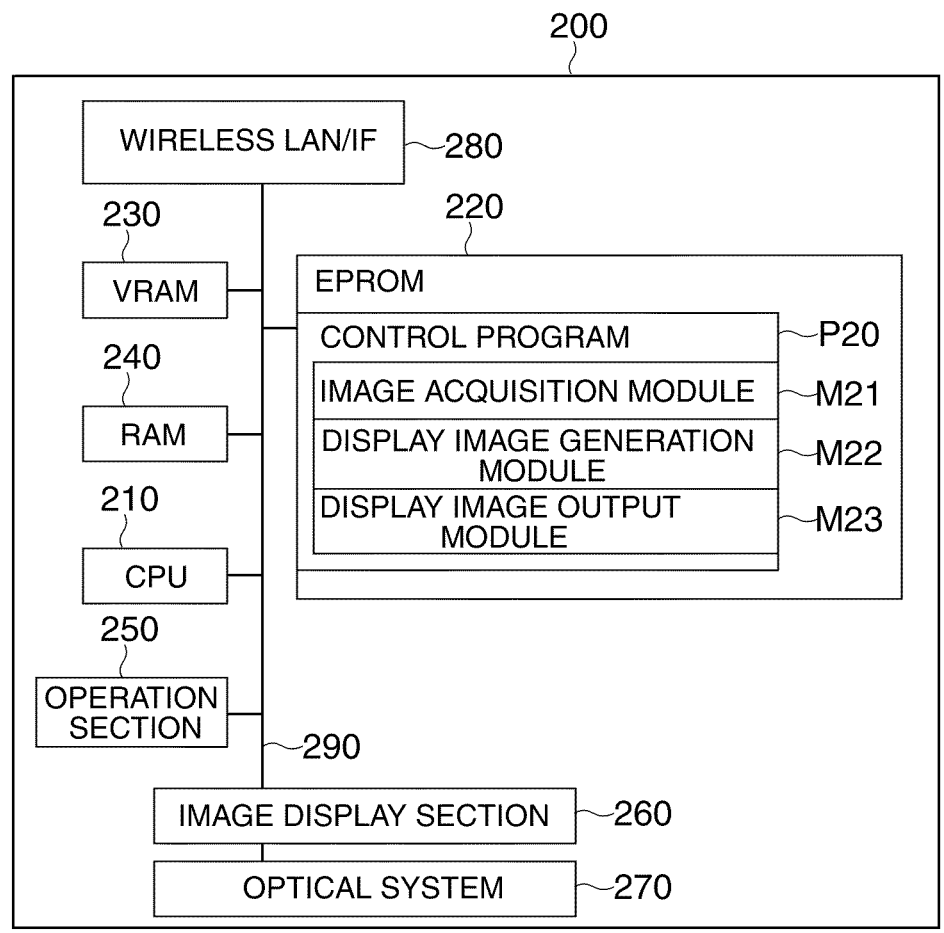

FIG. 3 is a block diagram schematically showing an internal configuration of the image display device according to the first embodiment. The image display device 200 in at least one embodiment is a projector. The image display device 200 is provided with a CPU 210, a nonvolatile memory (erasable programmable read only memory (EPROM) in the present embodiment) 220, VRAM 230, RAM 240, an operation section 250 such as an operation button or a touch panel, an image display section 260, an optical system 270, and a wireless LAN/IF 280. These constituents 210 through 280 are connected to each other via a common bus 290 so as to allow two-way communication. A magnetic disk storage device can also be used instead of the EPROM 220.

The CPU 210, which is a logic circuit for executing various kinds of arithmetic processing, expands various programs and modules stored in, for example, the EPROM 220 in the RAM 240, and then executes them. The RAM 240 is a volatile memory device, and temporarily stores the result of calculation by the CPU 210. The VRAM 230 is a memory device for temporarily buffering the image data to be supplied to the image display section 260. The image display section 260 is used for generating the image for projection using the image data stored in the VRAM 230. As the image display section 260, a device for modulating light from an RGB light source using liquid crystal panels, a device for modulating the light using digital micromirror devices (DMD) can be used, for example. The optical system 270 is composed of a plurality of lenses, and is used for projecting the image generated in the image display section 260 on the projection surface with a predetermined size. The wireless LAN/IF 280 communicates a signal in a wireless manner between the image display device 200 and external equipment such as the image supply device 100. Instead of the wireless interface, a wired interface such as an USB interface can also be provided.

The EPROM 220 stores a control program P20 for controlling the image display device 200. The control program P20 includes various functions for controlling the image display device 200, and only the functions necessary for the explanations of the present embodiment are selectively shown here. The control program P20 is provided with an image acquisition module M21, a display image generation module M22, and a display image output module M23. It should be noted that the functions of the modules are realized by the CPU 110 executing the respective modules.

The image acquisition module M21 acquires an image of a display content (supply content) to be displayed as the projector projection image described later from the image supply device 100. The display image generation module M22 generates the image data of the projector projection image including the image of the display content thus acquired. The display image output module M23 displays the display image on the image display section 260 based on the image data thus generated.

Operation of Image Display System

Figure 4A:
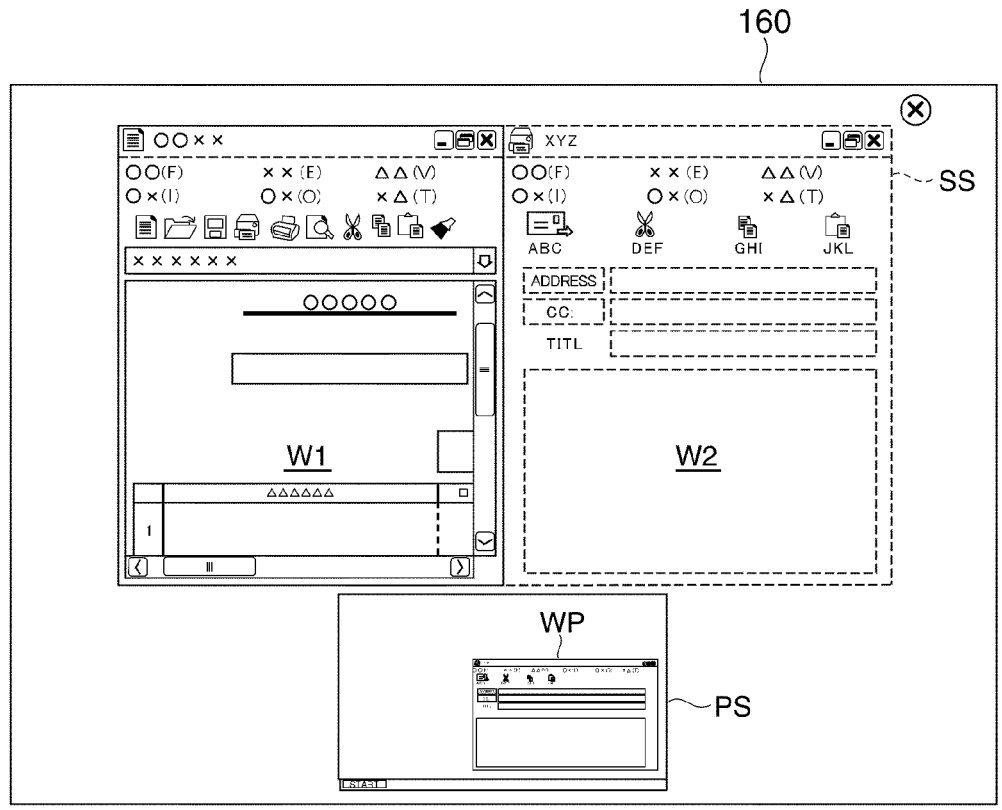
Figure 4B:
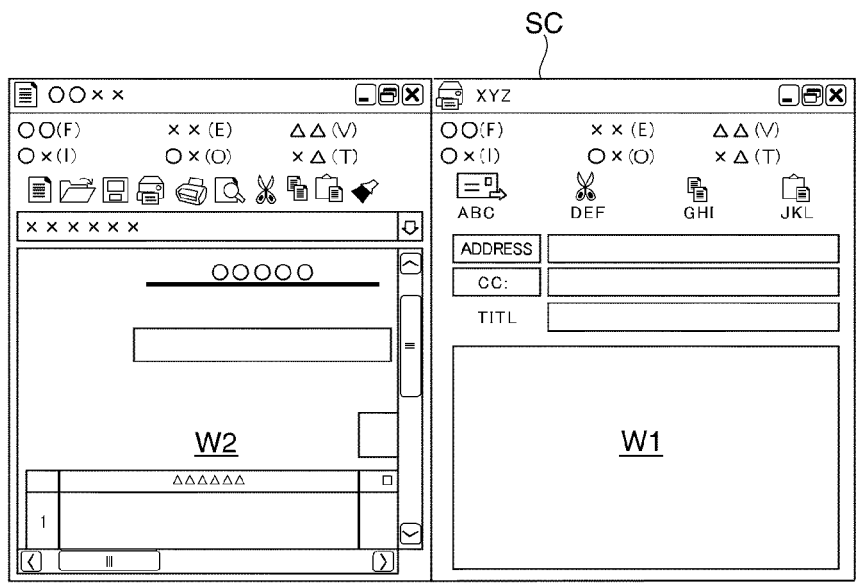
Figure 6A:
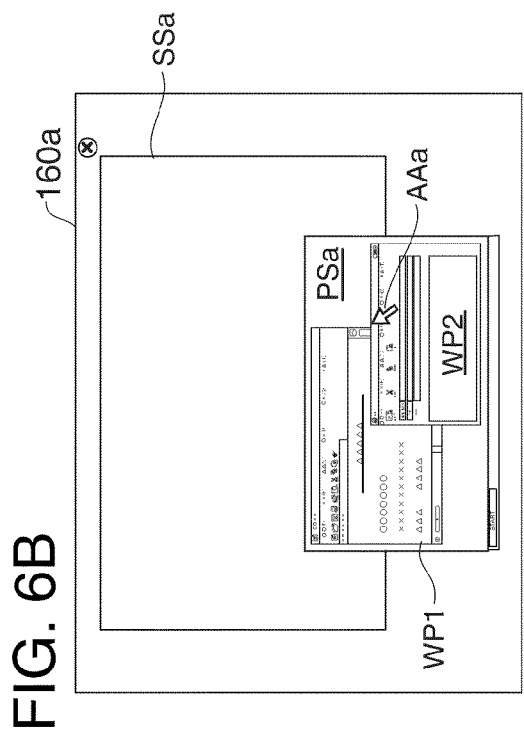
FIGS. 6A through 6D are a second group of diagrams for illustrating an operation of the image display system.
Figure 6B:
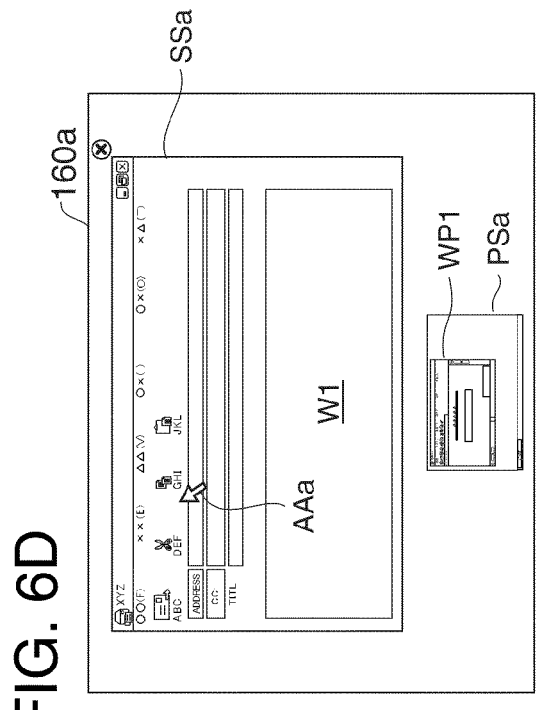
Figure 6C:
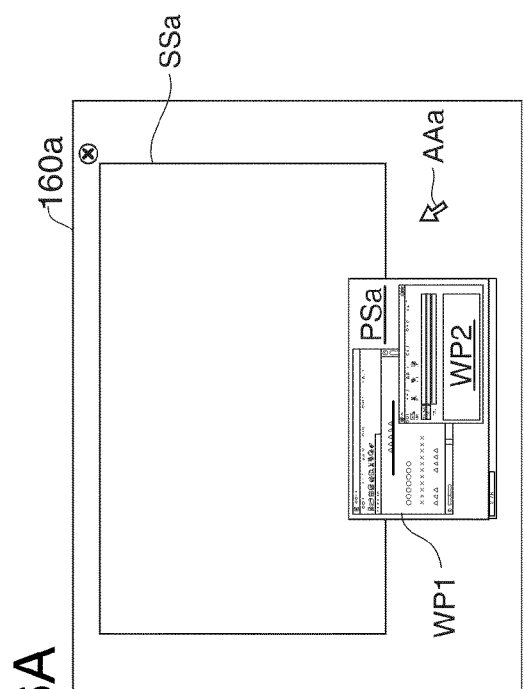
Figure 6D:
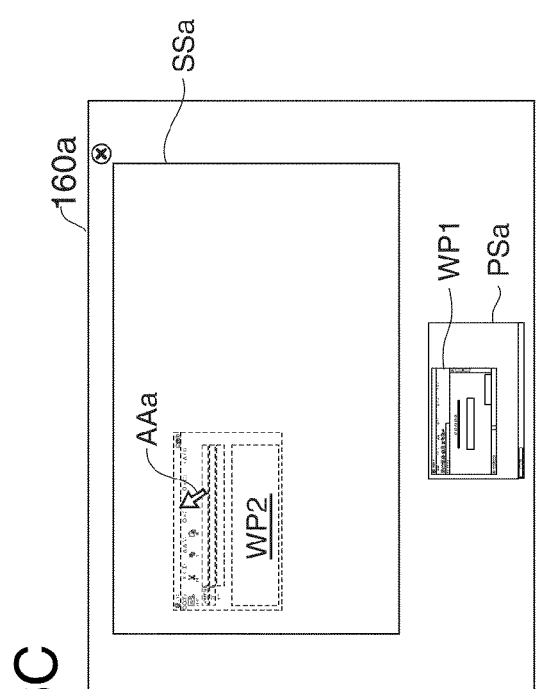
Figure 7A:
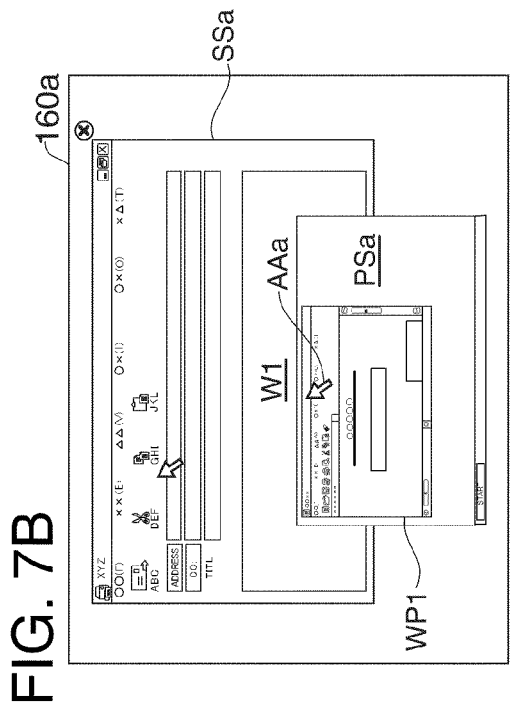
FIGS. 7A through 7D are a third group of diagrams for illustrating an operation of the image display system.
Figure 7B:
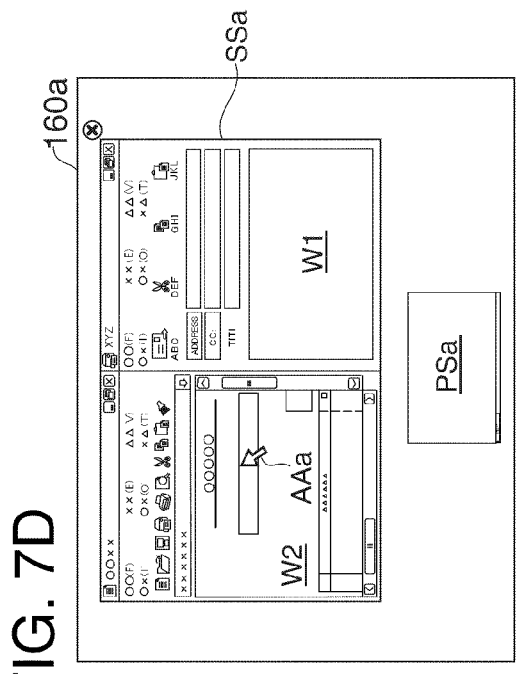
Figure 7C:
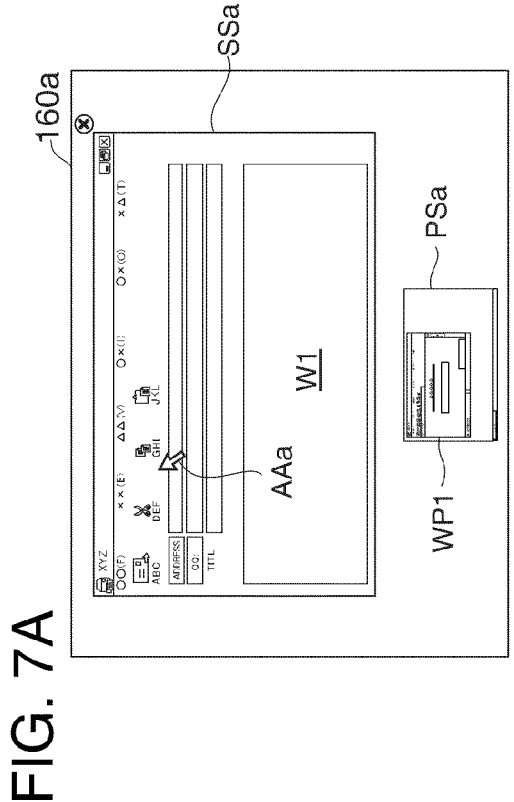
Figure 7D:
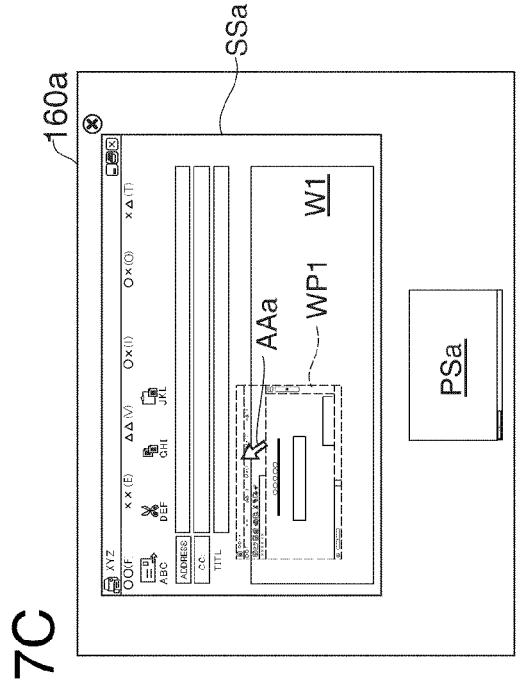

FIGS. 4A and 4B are diagrams schematically showing images displayed when the image display system operates. FIG. 4A shows an image (hereinafter referred also to a projector operation screen) displayed on the display section 160 of the image supply device 100 while the image display system 1 is in operation. FIG. 4B shows an image displayed on the image display section 260 of the image display device 200, namely an image (hereinafter referred to also as a projector projection image) projected on a screen SC via the image display section 260 and the optical system 270 while the image display system 1 is in operation.

The projector operation screen is a screen displayed when the image supply program P1 is started in the image supply device 100. In the projector operation screen, a first area SS and a second area PS are displayed. The first area SS is an area for displaying the display content displayed as the projector projection image. The second area PS is an area for displaying the image of the desktop in the normal condition (when the image supply program P1 is not started) of the image supply device 100 in reduced size. In the second area PS, the content WP of the application program (e.g., the word-processing program P2 or the e-mail program P3), which is running, similarly to the desktop screen in the normal condition. In the first area SS, there is displayed basically the same content as the projector projection image (FIG. 4B). The first area SS is divided into a plurality of areas, and the contents are displayed in the respective areas obtained by thus dividing the first area SS. Hereinafter, the contents displayed in the first area SS or as the projector projection image are also referred to as display contents. In the present embodiment, the first area SS and the projector projection image can be divided into two display areas.

The point in which the content displayed in the first area SS and the image displayed as the projector projection image are different from each other is that all of the images of the projector projection image are displayed clearly while in the first area SS, among the display contents W1, W2 respectively displayed in the display areas thus obtained by the dividing operation, the display content corresponding to the content held by the image supply device 100 itself displaying the first area SS is displayed clearly on the one hand, the display content corresponding to the content of the other image supply devices 100 is displayed in a condition such as a graydown or semi-transparent condition in which the user can distinguish it from the display content corresponding to the content held by itself. Hereinafter, it is assumed that the display content displayed in the gray-down or semi-transparent condition is illustrated with broken lines as the display content W2 shown in FIG. 4A.

As is understood from the explanations described above, in the image display system 1 according to the present embodiment, it is possible to simultaneously display the screens of the contents supplied to the image display device 200 independently from the plurality of image supply devices 100, namely the first image supply device 100*a* and the second image supply device 100*b* (FIG. 1), respectively, as the display content in the projector projection image. For example, in the case in which one image of a display content is supplied from the first image supply device 100*a* to the image display device 200, and one image of a display content is supplied from the second image supply device 100*b* to the image display device 200 at the same time, the image display device 200 displays the image of the display content supplied from the first image supply device 100*a* in one of the divided display areas of the projector projection image while displaying the image of the display content supplied from the second image supply device 100*b* in the other of the divided display areas of the projector projection image, for example.

The image display device 200 transfers the image of the display content, which is supplied from the first image supply device 100*a*, to the second image supply device 100*b*, and transfers the image of the display content, which is supplied from the second image supply device 100*b*, to the first image supply device 100*a*. According to this operation, the first image supply device 100*a* can display the image including the image of the content held by the second image supply device 100*b* in the first area SS of the display section 160*a* of the first image supply device 100*a*. In the same manner, the second image supply device 100*b* can display the image including the image of the content held by the first image supply device 100*a* in the first area SS of the display section 160*b* of the second image supply device 100*b*.

FIGS. 5A through 5C are a first group of diagrams for explaining the operation of the image display system 1 using the projector operation screen. Explanations will hereinafter be presented basically exemplifying the operation of the image display system 1 using the first image supply device 100*a*. Hereinafter, the first area SS and the second area PS displayed on the display section 160*a* of the first image supply device 100*a* are each provided with "a" at the foot of the symbol thereof, and the first area SS and the second area PS displayed on the display section 160*b* of the second image supply device 100*b* are each provided with "b" at the foot of the symbol thereof.

FIG. 5A shows the projector operation screen in the condition in which a position designation icon (e.g., a mouse cursor, hereinafter referred to as a cursor) AAa displayed on the display section 160*a* of the first image supply device 100*a* is located neither on the first area SSa nor on the second area PSa. When the cursor AAa is moved from this location to a location on the first area SSa, the second area PSa is displayed in a smaller size, thereby displaying the first area SSa in a relatively emphasized manner (FIG. 5B). On the other hand, when the cursor AAa is moved to a location on the second area PSa, the second area PSa is enlargedly displayed in an emphasized manner (FIG. 5C).

FIGS. 6A through 6D are a second group of diagrams for explaining the operation of the image display system 1 using the projector operation screen. It is assumed that in the projector operation screen, in the condition in which two contents (windows) WP1, WP2 are displayed on the second area PSa, and no display (FIG. 6A) content is displayed in the first area SSa, the user operates the cursor AAa to drag (FIG. 6B) the content WP2 on the second area PSa, and to drop (FIG. 6C) it on the first area SSa. Then, the content WP2 having been displayed in the second area PSa is deleted, and the content WP2 is displayed (FIG. 6D) in the first area SSa as the display content W1. In this case, the first area SSa of the first image supply device 100*a* and the first area SSb of the second image supply device 100*b* always display the same projector projection image. In other words, in the projector projection image, the content WP2 is displayed as the display content similarly to the first area SSa of the first image supply device 100*a*. Further, in the first area SSb of the second image supply device 100*b*, the content WP2 is displayed as the display content in the gray-down or semi-transparent condition.

FIGS. 7A through 7D are a third group of diagrams for explaining the operation of the image display system 1 using the projector operation screen. It is assumed that in the projector operation screen, in the condition (FIG. 7A) in which the content WP1 is displayed on the second area PSa, and one display content W1 is displayed in the first area SSa, the user operates the cursor AAa to drag (FIG. 7B) the content WP1 on the second area PSa, and to drop (FIG. 7C) it on the first area SSa on the left side of the center thereof. Then, the content WP1 having been displayed in the second area PSa is deleted, and the content WP1 is displayed (FIG. 7D) in the first area SSa on the right side of the display content W1, which has already been displayed, as another display content W2. In the case in which the two display contents W1 and W2 are displayed at the same time, the first area SSa is laterally divided into two areas with the same portion as described above. In this case, the first area SSa of the first image supply device 100a and the first area SSb of the second image supply device 100b always display the same projector projection image. In other words, in the projector projection image, the two display contents W1, W2 are displayed similarly to the first area SSa of the first image supply device 100a. Further, in the first area SSb of the second image supply device 100b, the two display contents W1, W2 are displayed in the gray-down or semi-transparent condition.

Figure 8B:
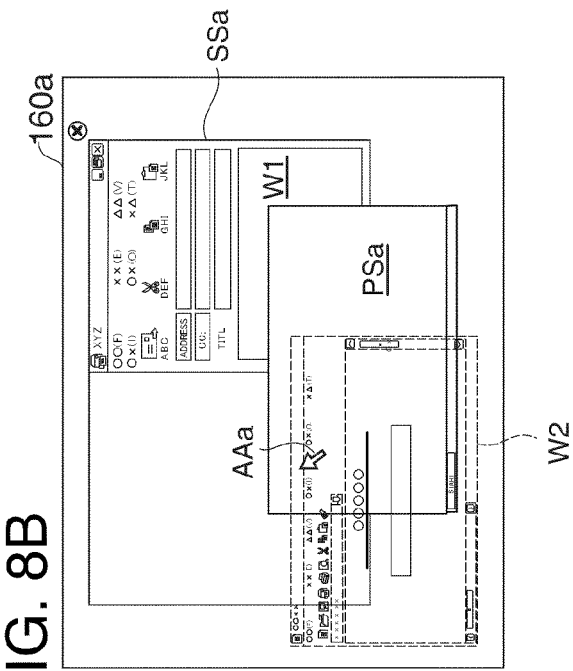
FIGS. 8A through 8C are a fourth group of diagrams for illustrating an operation of the image display system.
Figure 8A:
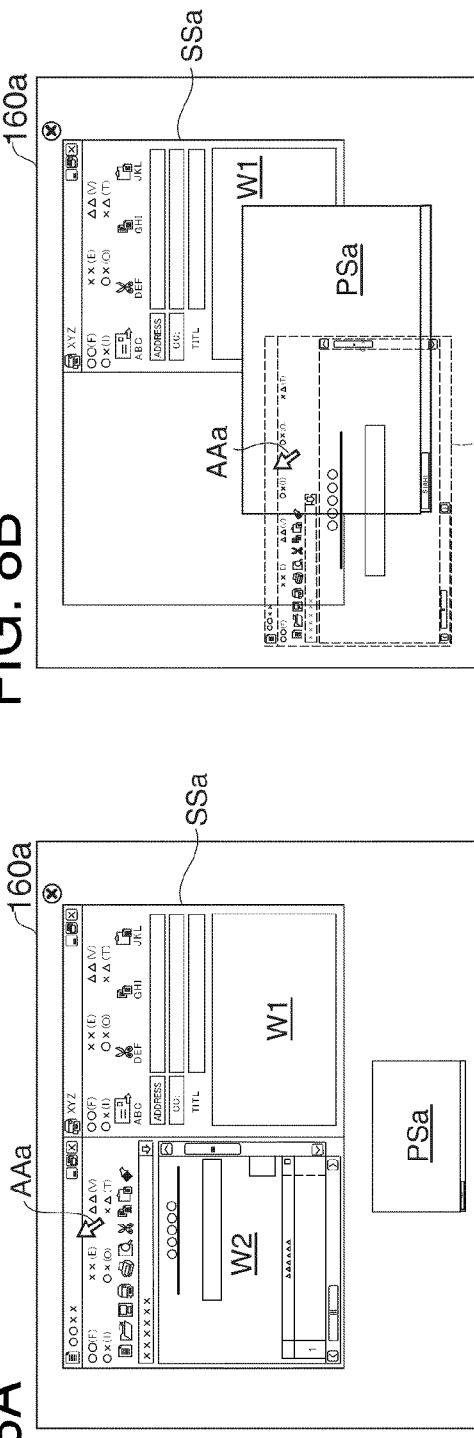
Figure 8C:
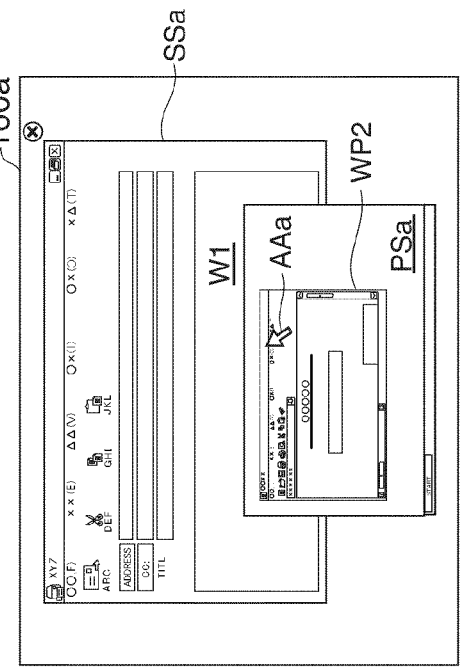

FIGS. 8A through 8C are a fourth group of diagrams for explaining the operation of the image display system 1 using the projector operation screen. It is assumed that in the projector operation screen, in the condition (FIG. 8A) in which the display contents W1, W2 are displayed in the first area SSa, the user operates the cursor AAa to drag (FIG. 8A) the display content W2 on the first area SSa, and to drop (FIG. 8B) it on the second area PSa. Then, the display content W2 having been displayed in the first area SSa is deleted, and the content WP2 corresponding to the display content W2 is displayed (FIG. 8C) in the second area PSa. The first area SSa changes from the condition of displaying the two display contents W1 and W2 at the same time to the condition of displaying only one display content W1. In such a case, the division of the first area SSa is canceled, and the display content W1 is displayed in the entire first area SSa. In this case, the first area SSa of the first image supply device 100a and the first area SSb of the second image supply device 100b always display the same projector projection image. In other words, in the projector projection image, the one display content W1 is displayed similarly to the first area SSa of the first image supply device 100a. Further, in the first area SSb of the second image supply device 100b, the one display content W1 is displayed in the gray-down or semi-transparent condition.

Figure 9A:
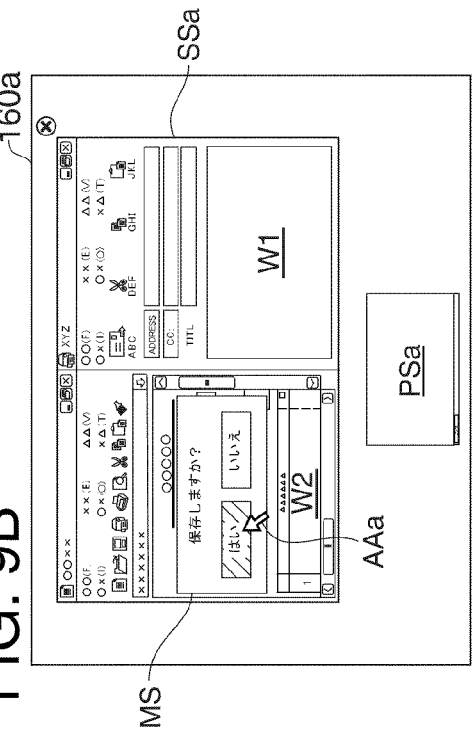
FIGS. 9A through 9C are a fifth group of diagrams for illustrating an operation of the image display system.
Figure 9B:
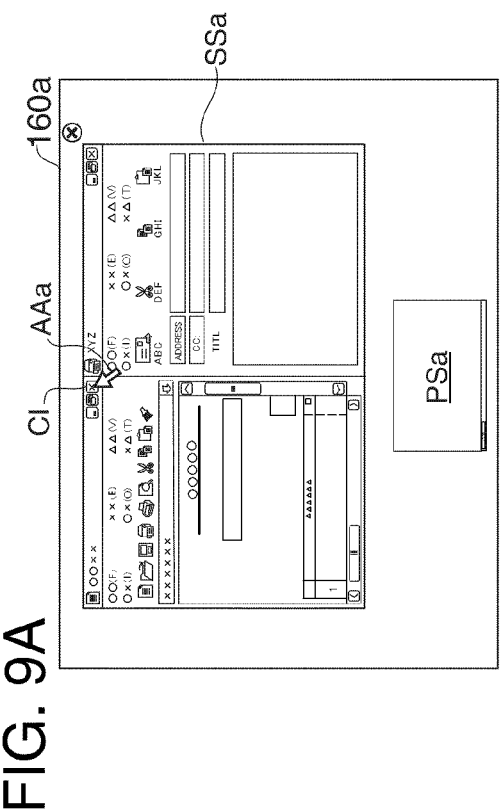
Figure 9C:
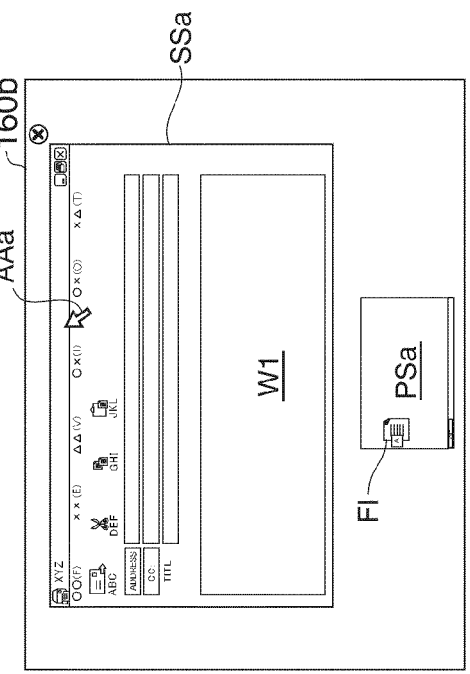

FIGS. 9A through 9C are a fifth group of diagrams for explaining the operation of the image display system 1 using the projector operation screen. In the projector operation screen, in the condition (FIG. 9A) in which the display contents W1, W2 are displayed in the first area SSa, when the user operates the cursor AAa to click (FIG. 9A) a close button (a button for the operation of instructing deletion of the display content) located upper right corner of the display content W2 on the first area SSa, a message asking if save will be executed with respect to the display content W2 having been displayed in the first area SSa is displayed (FIG. 9B). Here, when the user executes an affirmative selection (clicks "Yes"), the first area SSa is changed from a state of simultaneously displaying the two display contents W1 and W2 to a state of displaying just one display content W1 (FIG. 9C). In other words, the display content W2 is deleted from the first area SSa. In such a case, the division of the first area SSa is canceled, and the display content W1 is displayed in the entire first area SSa. Then, a file with the content of the display content W2 recorded thereon is created, and the file icon FI representing the file is displayed (FIG. 9C) in the second area PSa. In this case, the first area SSa of the first image supply device 100a and the first area SSb of the second image supply device 100b always display the same projector projection image. In other words, in the projector projection image, the one display content W1 is displayed similarly to the first area SSa of the first image supply device 100a. Further, in the first area SSb of the second image supply device 100b, the one display content W1 is displayed in the gray-down or semi-transparent condition.

Figure 10A:
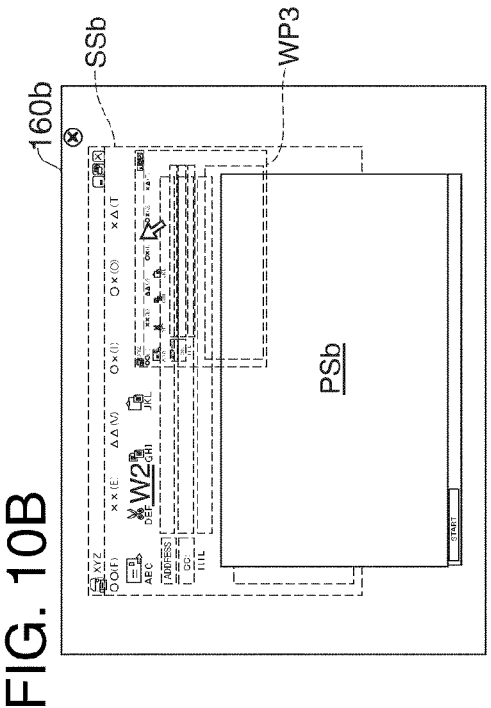
FIGS. 10A through 10C are a sixth group of diagrams for illustrating an operation of the image display system.
Figure 10B:
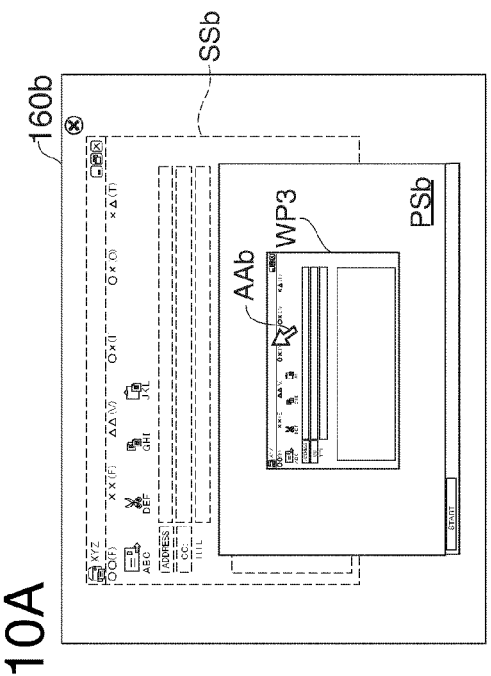
Figure 10C:
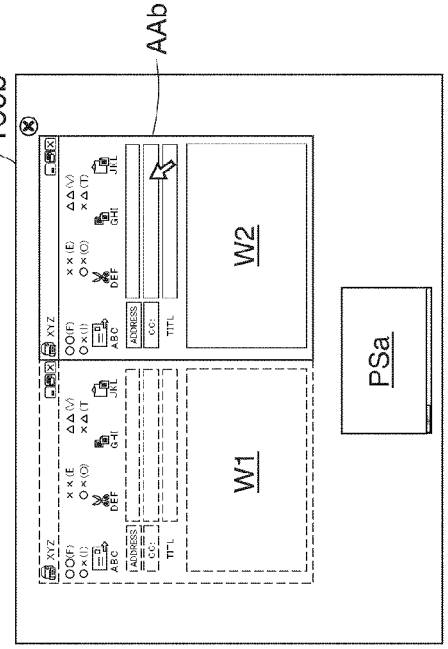

FIGS. 10A through 10C are a sixth group of diagrams for explaining the operation of the image display system 1 using the projector operation screen. The case of adding the content of the second image supply device 100b as the display content will be explained. It is assumed that in the projector operation screen of the second image supply device 100b, in the condition (FIG. 10A) in which the content WP3 is displayed on the second area PSb, and one display content W1 of the first image supply device 100a is displayed in the first area SSb in a gray-down or semi-transparent condition, the user operates the cursor AAb to drag (FIG. 10A) the content WP3 on the second area PSb, and to drop (FIG. 10B) it on the first area SSb on the right side of the center thereof. Then, the content WP3 having been displayed in the second area PSb is deleted, and the content WP3 is displayed (FIG. 10C) in the first area SSb on the right side of the display content W1, which has already been displayed, as another display content W2. In the first area SSb of the second image supply device 100b, the display content W1 is displayed in a gray-down or semi-transparent condition as a display content of the first image supply device 100a, and at the same time, the display content W2 is displayed clearly as the display content of the second image supply device 100b. In this case, the first area SSa of the first image supply device 100a and the first area SSb of the second image supply device 100b always display the same projector projection image. Specifically, in the projector projection image, the two display contents W1, W2 are displayed clearly. Further, in the first area SSa of the first image supply device 100a, the display content W1 is displayed clearly, while the display content W2 is displayed in the gray-down or semi-transparent condition.

Figure 11B:
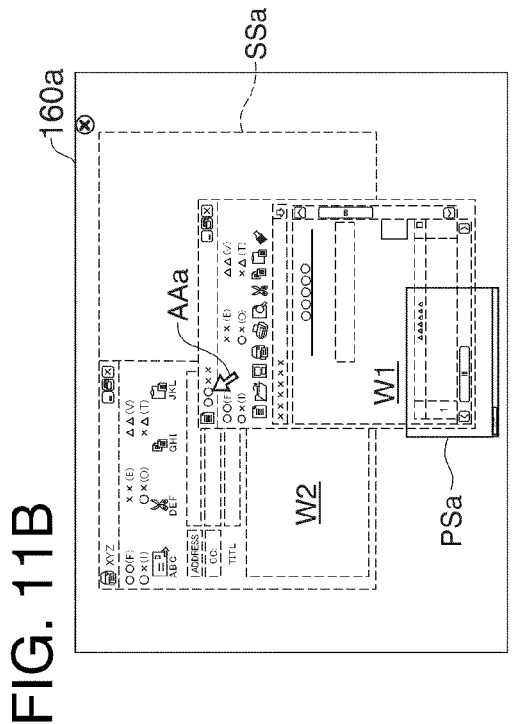
FIGS. 11A through 11C are a seventh group of diagrams for illustrating an operation of the image display system.
Figure 11A:
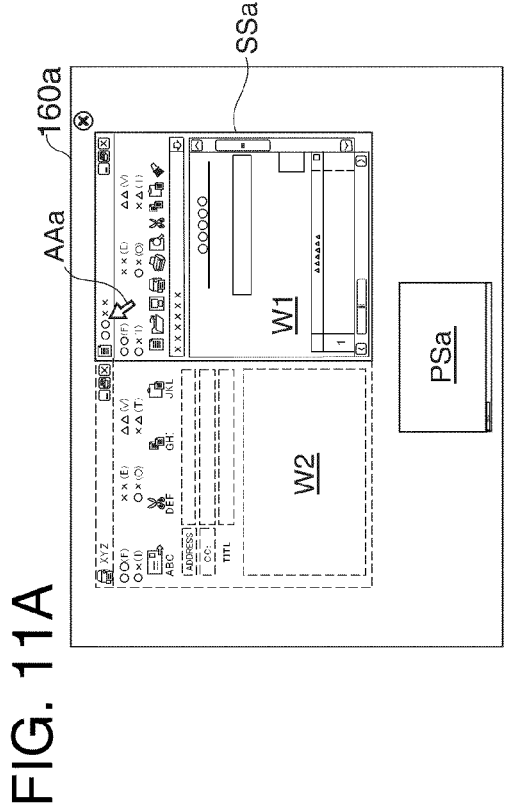
Figure 11C:
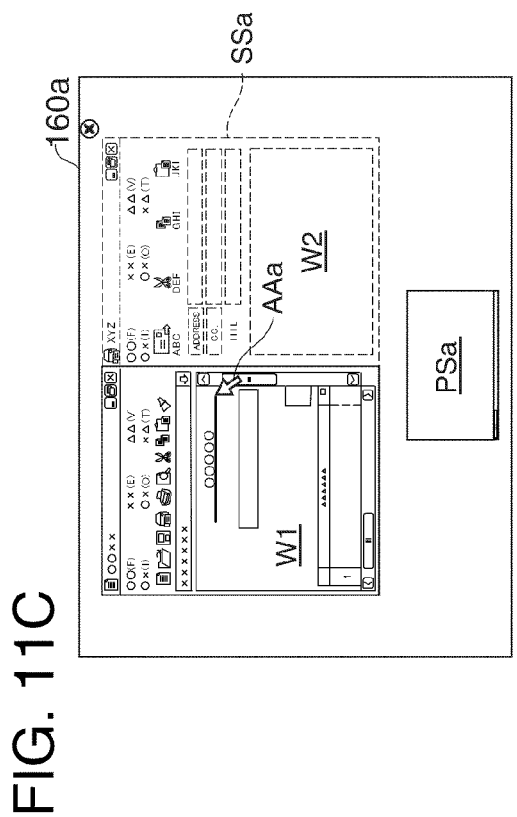

FIGS. 11A through 11C are a seventh group of diagrams for explaining the operation of the image display system 1 using the projector operation screen. It is assumed that in the projector operation screen, in the condition (FIG. 11A) in which the two display contents W1, W2 are displayed in the first area SSa, the user operates the cursor AAa to drag (FIG. 11A) one of the display contents (the display content W1 in the case shown in FIGS. 11A through 11C), and to drop (FIG. 11B) it on the other of the display contents (the display content W2 in the case shown in FIGS. 11A through 11C). Then, in the first area SSa, the display positions of the display content W1 and the display content W2 are switched or replaced with each other. In this case, the first area SSa of the first image supply device 100a and the first area SSb of the second image supply device 100b always display the same projector projection image. Specifically, the display positions of the two display contents W1, W2 are replaced with each other in the projector projection image and in the first area SSb of the second image supply device 100b similarly to the first area SSa of the first image supply device 100a.

Figure 12:
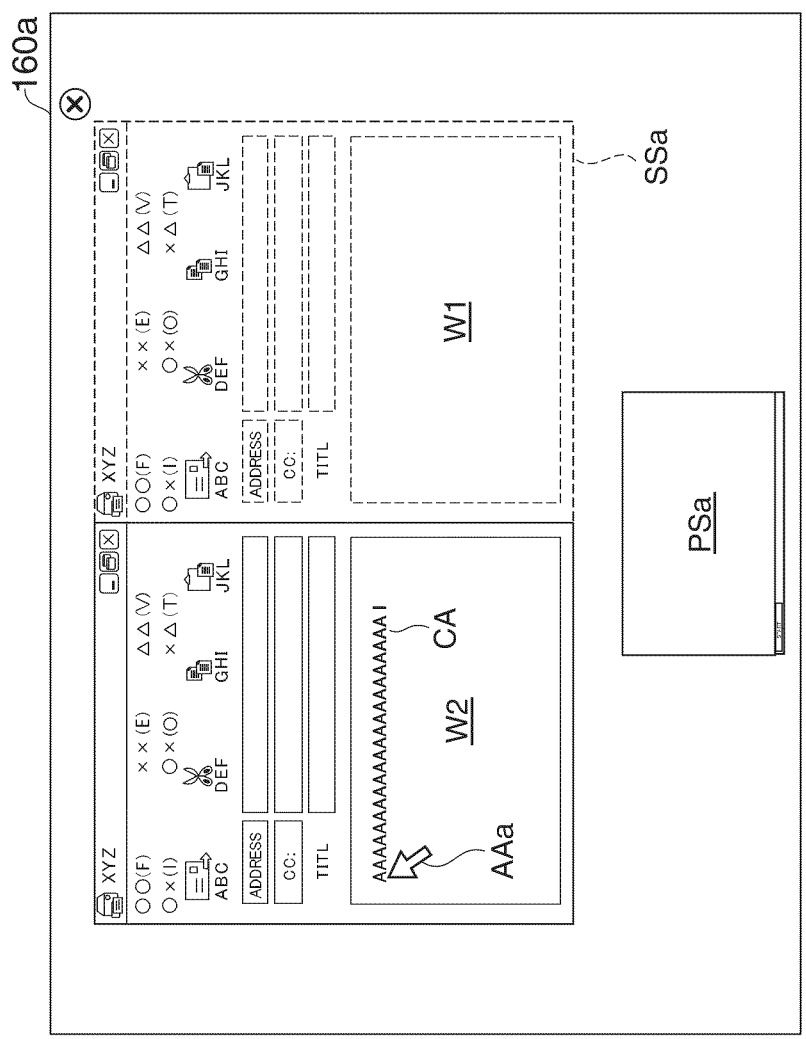
FIG. 12 is an eighth diagram for illustrating an operation of the image display system.

FIG. 12 is an eighth diagram for explaining the operation of the image display system 1 using the projector operation screen. In the first area SSa of the projector operation screen of the first image supply device 100a, editing operations such as addition or deletion of the content can be executed on the display content (the display content displayed clearly) selected by the first image supply device 100a itself similarly to the content while the normal application is running. In contrast, in the first area SSa of the projector operation screen of the first image supply device 100a, it is not allowed to execute the editing operation on the display content (the display content displayed in the gray-down or semi-transparent condition) selected by other image supply devices 100 (e.g., the second image supply device 100b). The same applies to the second image supply device 10b.

Figure 13A:
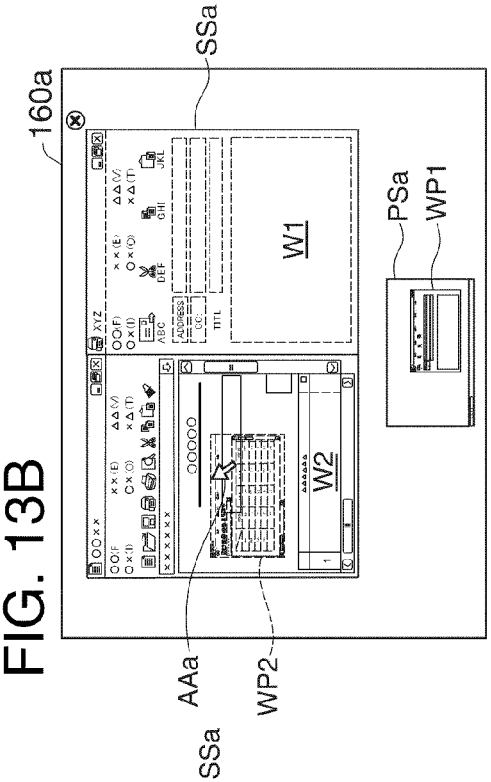
FIGS. 13A through 13C are a ninth group of diagrams for illustrating an operation of the image display system.
Figure 13B:
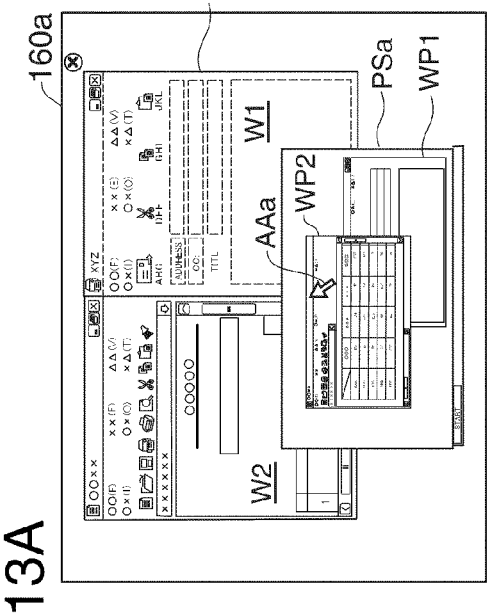
Figure 13C:
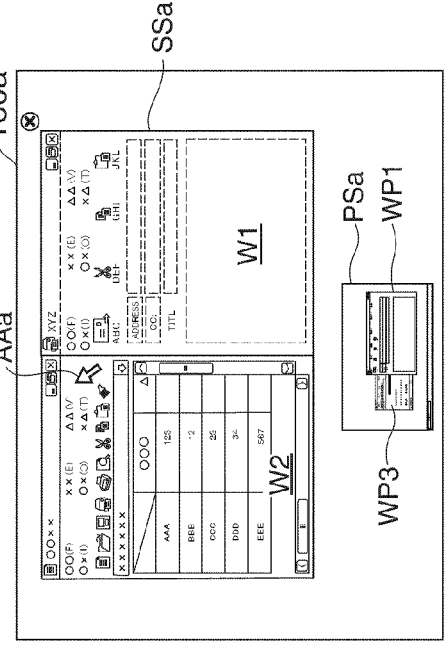

FIGS. 13A through 13C are a ninth group of diagrams for explaining the operation of the image display system 1 using the projector operation screen. In the present embodiment, the number of display contents which can simultaneously be displayed as the projector projection image or in the first area SSa is equal to or smaller than two. In the case in which the two display contents W1, W2 have already been displayed in the first area SSa or as the projector projection image, the display content (the display content displayed clearly) selected by the first image supply device 100a itself can be replaced with the content displayed in the second area PS in the projector operation screen of the first image supply device 100a. For example, it is assumed that the display content W2 selected by the first image supply device 100a itself and the display content W1 selected by another image supply device (e.g., the second image supply device 100b) are displayed in the first area SSa (FIG. 13A). It is further assumed that in this state, the user operates the cursor AAa to drag (FIG. 13A) the content WP2 on the second area PSa, and drop (FIG. 13B) it on the display content W2 on the first area SSa. Then, the content WP2 having been displayed in the second area PSa is deleted, and the content WP2 is displayed (FIG. 13C) in the first area SSa as the display content W2. On this occasion, the content WP3 having been displayed until then as the display content W2 is then displayed (FIG. 13C) in the second area PSa. In this case, the first area SSa of the image supply device 100a and the first area SSb of the second image supply device 100b always display the same projector projection image. In other words, in the projector projection image and the first area SSb, the content having been displayed as the display content W1 is switched from the content WP3 to the content WP2.

Figure 14B:
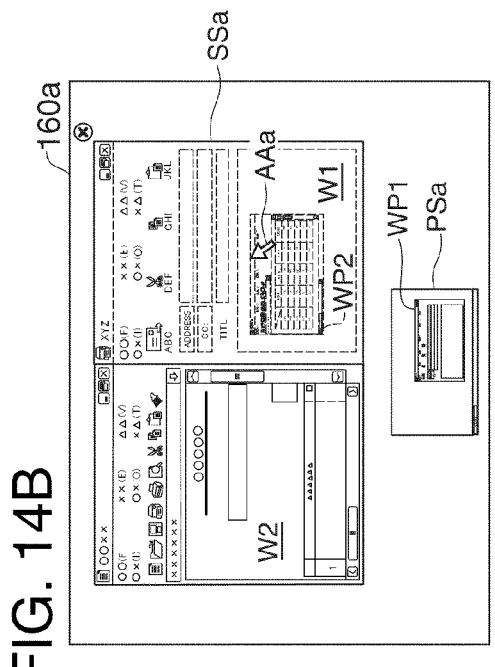
FIGS. 14A through 14C are a tenth group of diagrams for illustrating an operation of the image display system.
Figure 14A:
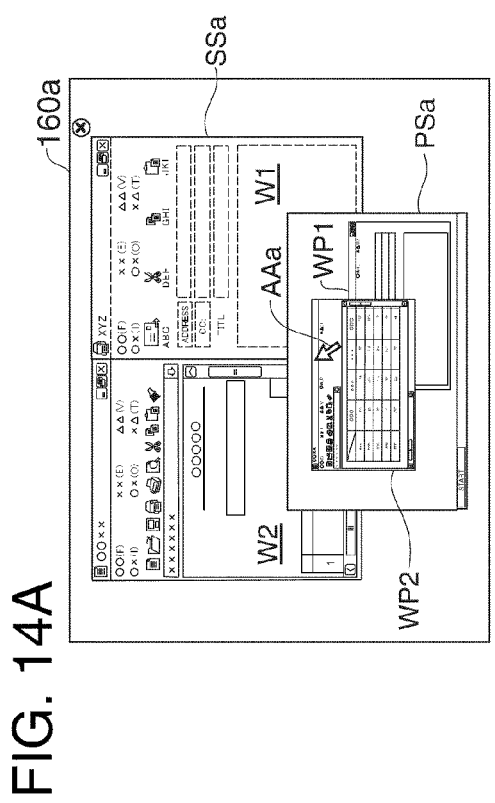
Figure 14C:
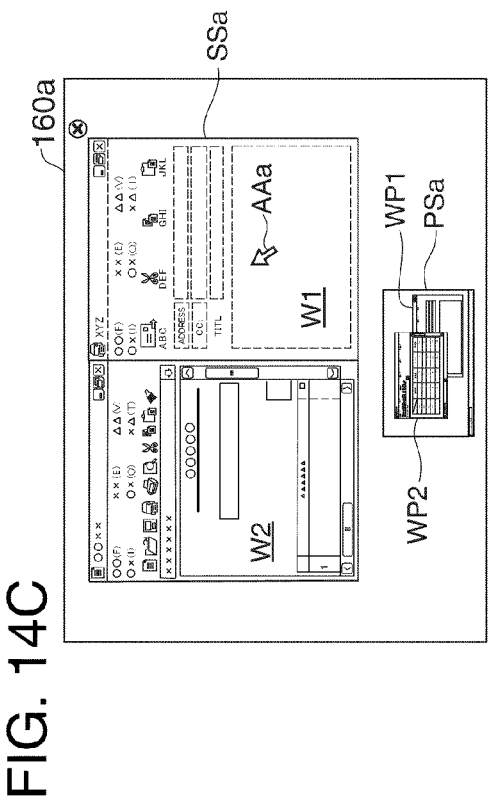

FIGS. 14A through 14C are a tenth group of diagrams for explaining the operation of the image display system 1 using the projector operation screen. In the case in which the two display contents W1, W2 have already been displayed in the first area SSa or as the projector projection image, it is not allowed to replace the display content (the display content displayed in the gray-down or semi-transparent condition) selected by another image supply device (e.g., the second image supply device 100b) with the content displayed in the second area PS in the projector operation screen of the first image supply device 100a. For example, it is assumed that the display content W2 selected by the first image supply device 100a itself and the display content W1 selected by another image supply device (e.g., the second image supply device 100b) are displayed in the first area SSa (FIG. 14A). It is further assumed that in this state, the user operates the cursor AAa to drag (FIG. 14A) the content WP2 on the second area PSa, and drop (FIG. 14B) it on the display content W1 on the first area SSa. Then, the content WP2 returns to a position on the second area PSa, and no change occurs in the first area SSa (FIG. 14C). In this case, since the first area SSa of the image supply device 100a and the first area SSb of the second image supply device 100b always display the same projector projection image, no change occurs in the projector projection image or the first area SSb.

According to embodiments described hereinabove, in the image display system 1 capable of projecting the display contents of a plurality of image supply devices 100 while dividing the projector projection image by the image display device 200, it is possible for the user to realize determination of the projection location, movement of the projection location, replacement of the display content to be projected, addition and deletion of the display content to be projected with more intuitive and easier-to-understand operations. Further, the user can conveniently edit the content of the display content selected by the user in the first area SSa.

B. Second Embodiment

Figure 15:
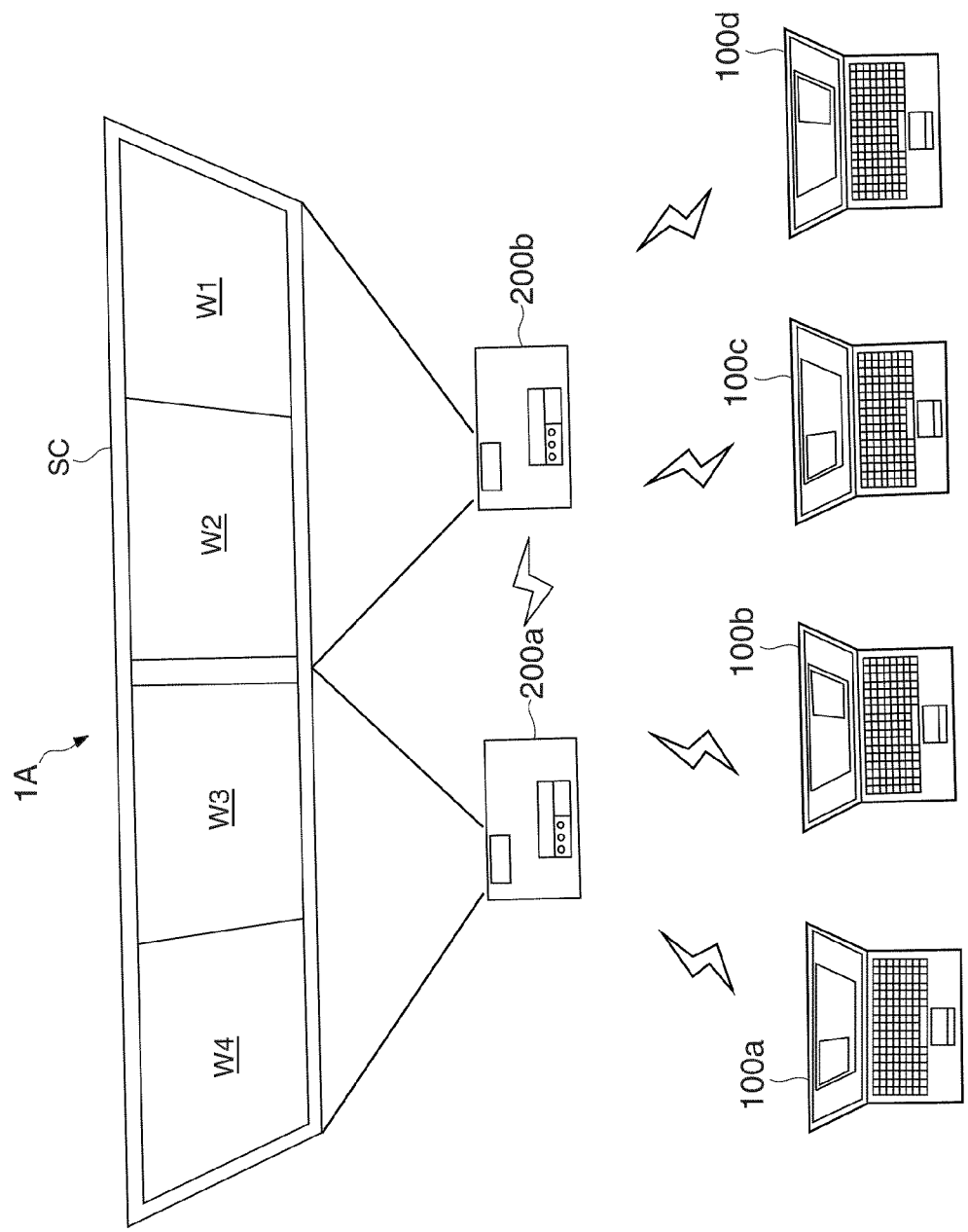
FIG. 15 is an explanatory diagram showing a schematic configuration of an image display system according to an embodiment.

FIG. 15 is an explanatory diagram showing a schematic configuration of an image display system according to a second embodiment. The image display system 1A according to the second embodiment is equipped with two image display devices 200a, 200b, and four image supply devices 100a through 100d. In the present embodiment, the projector projection image can include up to four display contents W1 through W4 as shown in FIG. 15. Although not shown in the drawings, in the projector operation screens of the respective image supply devices 100a through 100d, an image based on the operation of the projector operation screen is displayed in each of the first areas SSa through SSd, and it is possible to perform determination of the projection location, movement of the projection location, replacement of the display content to be projected, addition and deletion of the display content to be projected with intuitive operations similarly to the first embodiment. As described above, in the image display system, any number N (N is a natural number equal to or greater than 2) can be adopted as the number of image supply devices 100. Further, the number of image display devices 200 can be set to be any number K (K is a natural number equal to or greater than 1).

C. MODIFIED EXAMPLES

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways.

First Modified Example

Figure 16A:
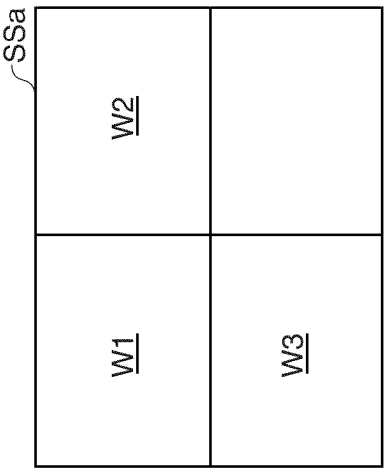
FIGS. 16A through 16D are diagrams schematically showing a first area of a projector operation screen according to an embodiment.
Figure 16B:
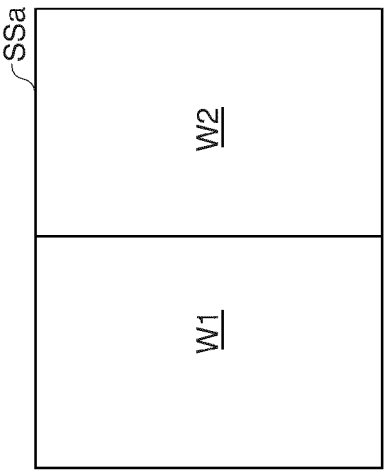
Figure 16C:
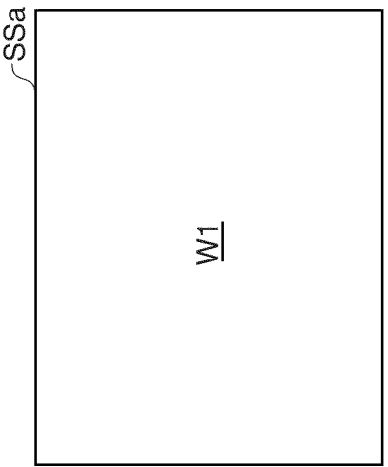
Figure 16D:
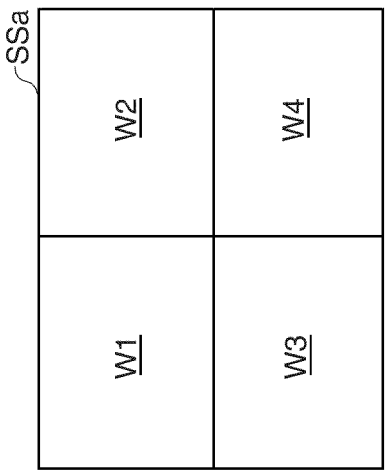

For example, although in the first embodiment up to two display contents W1, W2 can simultaneously be displayed, this is not a limitation, but it is possible to arrange that an arbitrary number of display contents can be displayed. FIGS. 16A through 16D are diagrams schematically showing the first area SSa of a projector operation screen according to the first modified example. In the first modified example, up to four display contents can be displayed. In the case of displaying one display content W1, the display content W1 is displayed in the entire area of the first area SSa and the projector projection image (FIG. 16A). Further, if the display content W2 is added in this state, each of the first area SSa and the projector projection image is laterally divided into two equal parts, and the display contents W1, W2 are respectively displayed in the two equal parts (FIG. 16B). Further, if the display content W3 is further added in this state, each of the first area SSa and the projector projection image is divided in both lateral and vertical directions into four equal parts, and the display contents W1, W2, W3 are respectively displayed in the three out of the four equal parts (FIG. 16C). Further, if the display content W4 is further added in this state, the display contents W1, W2, W3, W4 are displayed respectively in the four equal parts (FIG. 16D). As the display content is deleted, the number of division of the first area SSa and the projector projection image decreases on the other way round. As described above, it is also possible to control the number of division of the first area SSa and the projector projection image in accordance with the number of display contents selected, thereby displaying the display contents in the most eye-friendly form. In the present modified example, it is not allowed to display five or more display contents simultaneously, and if it is attempted to select five or more display contents at a time, replacement of the display contents occurs similarly to the case of the first embodiment.

Second Modified Example

In the embodiments described above, although selection of the display contents is executed in accordance with drag and drop of the content WP from the second area PS to the first area SS, this is not a limitation. For example, it is also possible to arrange that when a content WP is double-clicked in the second area PS, the content WP is selected as the display content. It should be noted that according to the drag and drop operation, there is an advantage that the display location in the first area SS or the projector projection image where the content WP is displayed as the display content can easily be designated.

Third Modified Example

Although in the embodiments cancellation (deletion from the first area SS and the projector projection image) of the selection of the display content is executed in accordance with drag and drop of the display contents from the first area SS to the second area PS, this is not a limitation. For example, it is also possible to arrange that when a display content is double-clicked in the first area SS, selection of the display content is canceled.

Fourth Modified Example

Although in the embodiments described above the first area SS and the second area PS are displayed simultaneously in the projector operation screen, the arrangement that a mode of displaying the first area SS in the display section 160 and a mode of displaying the second area PS are switched by an operation of the user can also be adopted instead thereof.

Fifth Modified Example

Although in embodiments described above the image display device 200 is a projector, other types of image display devices can also be adopted instead thereof. Specifically, a liquid crystal display, an organic EL display, a plasma display, a rear projection display incorporating a projector, and so on can be adopted.

Sixth Modified Example

In the embodiments described above, it is possible to replace a part of the configuration realized by hardware with software, or to replace a part of the configuration realized by software with hardware.

Although specific embodiments are hereinabove explained, the disclosure is not to be limited by such embodiments or modified examples, but can be put into practice in various forms within the scope or the spirit of the disclosure.

What is claimed is:

1. An image display system comprising:
   an image display device configured to project a display image based on supply content; and
   a plurality of image supply devices, each of the image supply devices including
      a display that is separate from the image display device, each display having a first display area configured to display an image corresponding to the display image projected by the image display device, and
      a content selection section configured to receive a selection of supply content from among a plurality of supply contents stored with the image supply device to be communicated to and projected by the image display device, and
   wherein:
      the image display device is configured to receive the supply content from at least two of the image supply devices and project the supply content as the display image,
      the first display area of a first image supply device of the at least two image supply devices shows a first supply content selected by the content selection section of the first image supply device and a second supply content selected by the content selection section of a second image supply device of the at least two image supply devices,
      the first supply content is shown in the same manner in both the first display area of the first image supply device and the display image projected by the image display device, and
      the second supply content is shown in an adjusted condition in the first display area of the first image supply device in comparison with the second supply content shown in the display image projected by the image display device.

2. The image display system according to claim 1, wherein the display of the image supply device further comprises a second display area, the second display area displaying the plurality of supply contents stored with the image supply device, and
   the content selection section receives the selection of the supply content by receiving a user operation connected with the second display area.

3. The image display system according to claim 2, wherein the user operation includes selecting the supply content from the second display area, and designating a location in the first display area for receiving the supply content, and
   the image supply device is configured to display the selected supply content at the designated location in the first display area.

4. The image display system according to claim 1, wherein each of the first display areas and the display image projected by the image display device are divided into a plurality of divisional areas, and each of the selected supply contents are displayed in one of the divisional areas.

5. The image display system according to claim 1, wherein the supply content selected from the image supply device is editable in the first display area of the image supply device.

6. The image display system according to claim 1, wherein
each of the image supply devices further includes a content selection cancellation section configured to cancel the selection of the supply content upon receiving a user cancellation operation connected with the first display area, and the image display device is configured to cancel display of the supply content in the first display area in response to receiving the user cancellation operation.

7. An image display device configured to display supply content received from a plurality of image supply devices, comprising:
an image acquisition section configured to receive supply content selected in at least two image supply devices;
a display image generation section configured to generate a display image comprising the received supply content; and
an image display section configured to project the generated display image,
wherein:
each of the at least two image supply devices includes a display that is separate from the image display device, each display having a first display area configured to display an image corresponding to the display image projected by the image display device,
the first display area of a first image supply device of the at least two image supply devices shows a first supply content selected in the first image supply device and a second supply content selected in a second image supply device of the at least two image supply devices,
the first supply content is shown in the same manner in both the first display area of the first image supply device and the generated display image projected by the image display section of the image display device, and
the second supply content is shown in an adjusted condition in the first display area of the first image supply device in comparison with the second supply content shown in the generated display image projected by the image display section of the image display device.

8. A first image supply device configured to communicate supply content to an image display device having an image display section for projecting a display image, the image display device being configured to receive supply content from the first image supply device and from at least a second image supply device and project the supply content as the display image, the first image supply device comprising:
a display that is separate from the image display device, the display having a first display area configured to display an image corresponding to the display image projected by the image display section of the image display device;
a content selection section configured to receive a selection of supply content from among a plurality of supply contents stored with the first image supply device; and
an image supply section configured to supply the image display device with the selected supply content,
wherein:
the first display area of the first image supply device shows a first supply content selected by the content selection section of the first image supply device and a second supply content selected by a content selection section of the second image supply device,
the first supply content is shown in the same manner in both the first display area of the first image supply device and the display image projected by the image display device, and
the second supply content is shown in an adjusted condition in the first display area of the first image supply device in comparison with the second supply content shown in the display image projected by the image display device.

9. An image display method for displaying a display image from an image display device based on supply content from a plurality of image supply devices, the method comprising:
receiving a selection of supply content from among a plurality of supply contents stored with one of the image supply devices and communicating the selected supply content to the image display device;
receiving, by the image display device, the supply content from at least two of the image supply devices, each of the at least two image supply devices including a display that is separate from the image display device;
projecting, from the image display device, the received supply content as the display image; and
displaying an image corresponding to the display image projected by the image display device on first display areas of the displays of each of the image supply devices,
wherein the displaying the image corresponding to the display image projected by the image display device on the first display areas of the displays of each of the image supply devices includes:
showing, in a first display area of a first image supply device of the at least two image supply devices, a first supply content selected in the first image supply device and a second supply content selected in a second image supply device of the at least two image supply devices,
showing the first supply content in the same manner in both the first display area of the first image supply device and the display image projected by the image display device, and
showing the second supply content in an adjusted condition in the first display area of the first image supply device in comparison with the second supply content shown in the display image projected by the image display device.

10. A computer program product comprising instructions executable by a computer in an image display device configured to project supply content received from a plurality of image supply devices on a first display section, the instructions executable to perform functions comprising:
acquiring supply content selected in at least two of the image supply devices, each of the at least two image supply devices including a display that is separate from the image display device;
generating a display image comprising the received supply contents; and
projecting, from the image display device, the generated display image on the first display section,
wherein the projecting the generated display image on the first display section includes:
showing, in a first display area of a first image supply device of the at least two image supply devices, a first supply content selected in the first image supply device and a second supply content selected in a second image supply device of the at least two image supply devices,
showing the first supply content in the same manner in both the first display area of the first image supply device and the generated display image projected by the image display section, and showing the second supply content in an adjusted condition in the first display area of the first image supply device in comparison with the second supply content shown in the generated display image projected by the image display section.

11. A computer program product comprising instructions executable by a computer in a first image supply device configured to provide supply content to an image display device having an image display section for projecting a display image, the image display device being configured to receive supply content from the first image supply device and from at least a second image supply device and project the supply content as the display image, the instructions executable to perform functions comprising:

displaying, in a first display area of a display of the first image supply device, an image corresponding to the display image projected by the image display section of the image display device, the display of the first image supply device being separate from the image display device;

receiving a selection of supply content from among a plurality of supply contents stored with the first image supply device; and supplying the image display device with the selected supply content, wherein the displaying the image corresponding to the display image projected by the image display section of the image display device includes:

showing, in the first display area of the first image supply device, a first supply content selected in the first image supply device and a second supply content selected in the second image supply device, showing the first supply content in the same manner in both the first display area of the first image supply device and the display image projected by the image display device, and showing the second supply content in an adjusted condition in the first display area of the first image supply device in comparison with the second supply content shown in the display image projected by the image display device.

12. The image display system according to claim 1, wherein the adjusted condition consists of at least one of a graydown condition and a semi-transparent condition.

* * * * *